United States Patent
Schön et al.

(10) Patent No.: US 9,563,049 B2
(45) Date of Patent: Feb. 7, 2017

(54) PROCEDURE AND DEVICE FOR TERMINATING THE IMMERSION AT A MICROSCOPE

(71) Applicant: Carl Zeiss Microscopy GmbH, Jena (DE)

(72) Inventors: Peter Schön, Göttingen (DE); Timo Rojahn, Uslar (DE); Alexander Scheps, Adelebsen (DE); Reiner Mitzkus, Göttingen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 9 days.

(21) Appl. No.: 14/617,108

(22) Filed: Feb. 9, 2015

(65) Prior Publication Data

US 2015/0260975 A1 Sep. 17, 2015

(30) Foreign Application Priority Data

Mar. 14, 2014 (DE) .................. 10 2014 003 684

(51) Int. Cl.
*G02B 21/33* (2006.01)
*G02B 21/24* (2006.01)
*G02B 21/26* (2006.01)

(52) U.S. Cl.
CPC ............. *G02B 21/33* (2013.01); *G02B 21/248* (2013.01); *G02B 21/26* (2013.01)

(58) Field of Classification Search
CPC ......... G02B 21/00; G02B 21/02; G02B 21/24; G02B 21/26; G02B 21/33; G02B 21/248; G02B 27/0006
USPC ....... 359/368, 381, 384, 391, 509, 656–661, 359/665–667; 436/174
See application file for complete search history.

(56) References Cited

U.S. PATENT DOCUMENTS

| | | | |
|---|---|---|---|
| 5,737,134 A * | 4/1998 | Watanabe | G02B 21/248 |
| | | | 359/381 |
| 5,870,223 A | 2/1999 | Tomimatsu | |
| 2003/0076585 A1 * | 4/2003 | Ledley | G02B 21/025 |
| | | | 359/368 |

(Continued)

FOREIGN PATENT DOCUMENTS

| | | |
|---|---|---|
| DE | 112004000341 | 4/2006 |
| DE | 102005040828 | 3/2007 |

(Continued)

OTHER PUBLICATIONS

German Search Report for German Application No. 102014003684.7, Oct. 14, 2014. English translation provided.

*Primary Examiner* — Bumsuk Won
*Assistant Examiner* — Ephrem Mebrahtu
(74) *Attorney, Agent, or Firm* — Patterson Thuente Pedersen, P.A.

(57) ABSTRACT

A procedure and a device for terminating the immersion at a microscope having one or more immersion lenses, or both immersion lenses and dry lenses, comprising a protective sheath around the immersion film area for preventing the escape of immersion media and an immersion media supply unit and an immersion media discharge unit connected with the protective sheath. The immersion media is removed in a controlled manner in particular in an automated microscope. Subsequently, the microscopic testing can be continued without the user having to intervene in the device or the process.

14 Claims, 2 Drawing Sheets

(56) References Cited

U.S. PATENT DOCUMENTS

| | | | | |
|---|---|---|---|---|
| 2004/0263961 | A1* | 12/2004 | Hummel | G02B 21/33 359/391 |
| 2006/0275918 | A1* | 12/2006 | Harada | G02B 21/33 436/174 |
| 2007/0291360 | A1* | 12/2007 | Pirsch | G02B 21/02 359/509 |
| 2008/0170292 | A1 | 7/2008 | Harada et al. | |
| 2008/0259446 | A1* | 10/2008 | Komatsu | G02B 21/33 359/391 |
| 2009/0091828 | A1 | 4/2009 | Fukuyama | |
| 2010/0027109 | A1* | 2/2010 | Liebel | G02B 21/24 359/381 |

FOREIGN PATENT DOCUMENTS

| | | |
|---|---|---|
| DE | 102007018862 | 10/2008 |
| JP | PH0777657 | 3/1995 |
| WO | WO2008/028475 | 3/2008 |

\* cited by examiner

PROCEDURE AND DEVICE FOR TERMINATING THE IMMERSION AT A MICROSCOPE

RELATED APPLICATIONS

The present application claims priority to German Application No. 10 2014 003 684.7 filed Mar. 14, 2014, said priority application being incorporated herein in its entirety by reference.

FIELD OF THE INVENTION

The invention relates to a procedure and a device for terminating the immersion at a microscope having one or more immersion lenses or immersion lenses and dry lenses, comprising a protective sheath around the immersion film area provided for the purpose of preventing the escape of immersion media and an immersion media supply unit connected with the protective sheath and an immersion media discharge unit.

BACKGROUND OF THE INVENTION

In microscopes, lenses form a central component. They are available with the most varied magnifications and resolutions. Typically, lenses with a greater magnification also have a higher resolution than lenses with a low magnification. For lenses with a particularly high resolution, the space between the lens and the sample is filled with a liquid. This may for example be water or oil. Such lenses are correspondingly also referred to as immersion lenses. By contrast, lenses without immersion are referred to as dry lenses.

In a manual inverted microscope, the user will, prior to using an immersion lens, apply a drop of the immersion liquid onto the lens and/or the sample carrier, subsequently insert the sample carrier into the table and carry out the desired examinations. Upon completion, the sample carrier is removed again and the remaining liquid is removed both from the front of the lens and from the bottom side of the sample carrier. The term sample carrier is here understood to mean both a classical object carrier and any other sample vessels such as microtiter plates, petri dishes and so on. During material examinations, the sample can, under certain circumstances, also be placed directly on the table without a special sample carrier being required.

However, in automated microscopes, a process of this type, where the user has to intervene, is neither desired nor possible. On the one hand it may be that the experiment is not yet finished with the end of the immersion examination, in which case a manual removal of the sample carrier including the subsequent cleaning process would interrupt the automated process. Also, if a plurality of like sample carriers is to be examined one after the other, it is of great disadvantage if a user has to intervene in the device after the examination of each sample carrier. Moreover, automated microscopes frequently include a housing, so that access to the individual components is not always easy.

If this cleaning process is dispensed with, the immersion media would run into the device when the lens is replaced, which can lead to functional incapacity of the entire microscope. In order to passively remove overflowing immersion media, Aquastop solutions exist. Their main purpose, however, is to protect the lens, which is provided with a sheath, on the outside of which the liquid can run off. Subsequently, it is discharged via a hose. However, this device is not suitable for terminating the immersion at the end of the use of the immersion lens.

Various devices have already been described which allow the automatic supply and discharge of immersion media. All of them are based on a cap-like arrangement that is placed on top or on the side of the immersion lens (DE 102005040828, US 2005/0179997, WO 2008028475, DE 10123027). However, these devices can only ever be used for one immersion lens at a time.

DE 102005040828 describes a device wherein the front of the lens is placed on a cylindrical vessel having a supply line and a discharge line, in order to pass immersion liquid into this vessel and subsequently discharge it therefrom. The control takes place either via pumps or via valves. After the use of the lens, the liquid can either run off or is sucked off. The solution is in each case tied to one lens at a time.

US 2005/0179997 describes a system in which it is possible to change from a dry lens to an immersion lens. The immersion liquid is supplied and discharged by means of pumps. Both lenses are arranged next to each other, so that the table has to be moved from one to the other. This solution, too, is tied to one lens.

In known Aquastop solutions, the lens is provided with a protective sheath, so that any overflowing immersion medium can flow off on the outside along the protective sheath and is discharged via a hose system, so that no damage to the lens or to the inside of the microscope is caused. These solutions are directed to the protection of the optical system from escaping immersion media.

The disadvantage all the known solutions have in common is that they are always tied to just one lens. Further, they need a lot of space around the lens. In microscopes, the lenses are as a rule mounted on a revolver, in order to provide the user with as many different lens options as possible. There is then usually only little installation space between the individual lenses. The use of the solutions described in the prior art can then lead to a situation in which the revolver positions next to the immersion lens have to remain free because the immersion caps occupy too much space. If a plurality of immersion lenses is to be used, each of them would then also have to be provided with such a cap, which would restrict the available space even further. Moreover, such a solution would be very expensive.

SUMMARY OF THE INVENTION

Proceeding from the disadvantages of the described solutions, the invention is based on the object of providing a device and a method which allow the immersion media to be removed in a controlled manner, in particular in an automated microscope, and which allow the microscopic examination to be continued, without the user having to intervene in the device or the process. At the same time, the solution should save as much space as possible and allow the use of a plurality of immersion lenses.

According to the invention, this object is achieved by means of a method of the type mentioned above with the features indicated in patent claim 1. Advantageous method steps are indicated in dependent claims 2 to 4. According to the invention, the object is further achieved by means of the device features indicated in patent claim 5. Advantageous embodiments are indicated in dependent claims 6 to 12.

According to embodiments of the invention, this object is achieved by means of the following method steps:
  starting the discharge of the immersion means passively and/or actively via a suction pump;

tipping the immersion lens in the direction of the discharge channel located on the protective sheath during the further discharge of the immersion medium;
terminating the discharge of the immersion media;
terminating the examination of the sample or replacing of the immersion lens; and
moving the immersion lens used so far or a newly selected one back into the initial position.

By tipping the immersion lens, the latter is pivoted slightly away from its optical axis, which means that the front of the lens is inclined slightly to one side, so that the immersion media is also correspondingly moved to this side. The sealing function of the protective sheath is preferably maintained. The immersion media discharge unit is now located in the position of the protective sheath, towards which the immersion lens is inclined. In this way, the immersion media can flow either passively or actively, aided by a suction pump, into the channel. In any case, it is removed in a controlled manner. Subsequently, either a replacement of the immersion lens may be carried out, a new sample carrier may be inserted or the examination may be terminated.

If a replacement of the immersion lens or a replacement of the immersion lens with a dry lens is to be carried out, a rotation of the lens revolver may also be combined with a lowering operation or with a subsequent lifting operation. In order to avoid, during the replacement of the lens, a collision of one of the lenses in the lens revolver with other elements of the microscope, in particular with the microscope table that holds the sample vessel, the entire lens revolver is lowered down prior to the rotation of the lens revolver. As an alternative it is also possible to lift the microscope table. Subsequently, the lens revolver is rotated into the desired position and is then lifted back up again.

In this process, the lens revolver can be lowered either prior to the slight pivoting out of the immersion lens from its optical axis or after the pumping off of the immersion media, but still prior to the replacement of the immersion lens. The latter is more advantageous because the suction pump then acts on the entire immersion media. If the lens revolver is first lowered and is then slightly pivoted out, the immersion media film between the lens front and the sample vessel bottom will be disrupted before the immersion media has been pumped off. In this case, the part of the immersion media that is located at the bottom of the sample vessel could no longer be reached by the suction pump.

The pumping off of the immersion media can start as early as prior to the tipping of the immersion lens. Under certain circumstances, the protective sheath (membrane) will no longer reliably fulfill its sealing function during a slight tipping of the immersion lens, so that the pumping off is advantageously carried out in advance.

The invention can be used both on an inverted and on an upright microscope, if the front optics of the condenser, which will then be located below the sample carrier, is supposed to be immersed.

BRIEF DESCRIPTION OF THE DRAWINGS

The invention will be explained in more detail below by way of an embodiment example, wherein.

DETAILED DESCRIPTION

Figure 1:
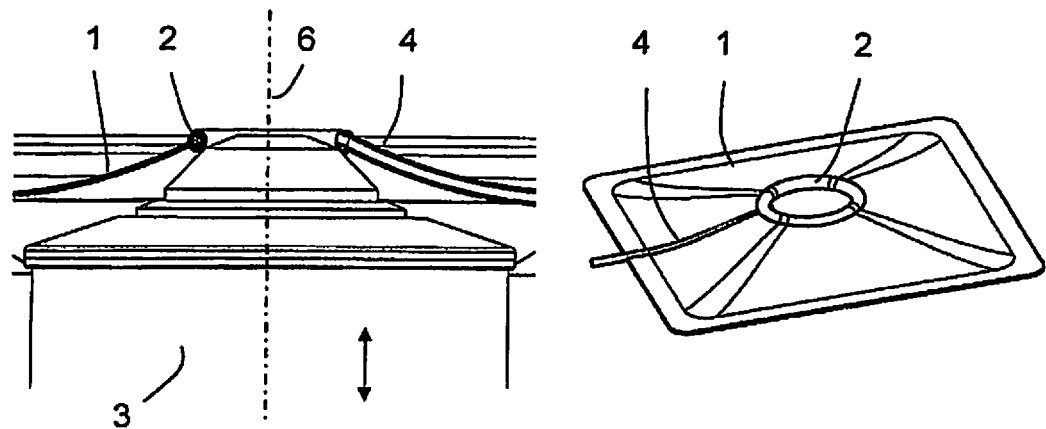
FIG. 1 depicts schematic views of the protective sheath formed as a membrane.

FIG. 1 shows views of a protective sheath 1 formed as a membrane and having a sealing edge 2. The sealing edge 2 causes an improved holding of the immersion media, which is not shown here, on the lens front of the immersion lens 3.

The protective sheath 1, which is formed as a moulded part, has a channel 4 that can be selectively used for supplying or discharging the immersion media.

Figure 2:
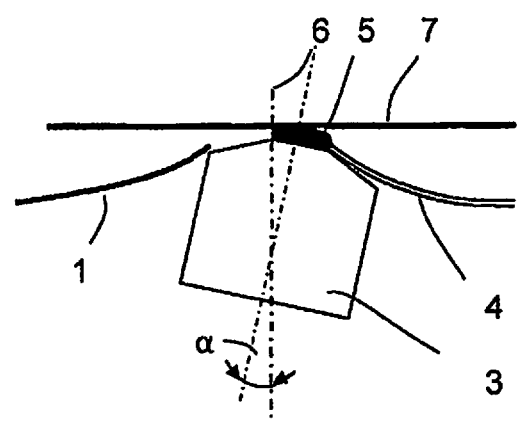
FIG. 2 depicts a schematic view of the positioning of the immersion lens for an improved discharge of the immersion media.

FIG. 2 shows the positioning of the immersion lens 3 for achieving an improved discharge of the immersion media 5. To this end, the immersion lens 3 is tipped by an angle α relative to the vertical (optical) axis 6. The angle α is here approx. 5 degrees. The resulting inclination relative to the sample vessel bottom 7 causes an improved discharge of the immersion media 5 into the channel 4 to be achieved.

Figure 3:
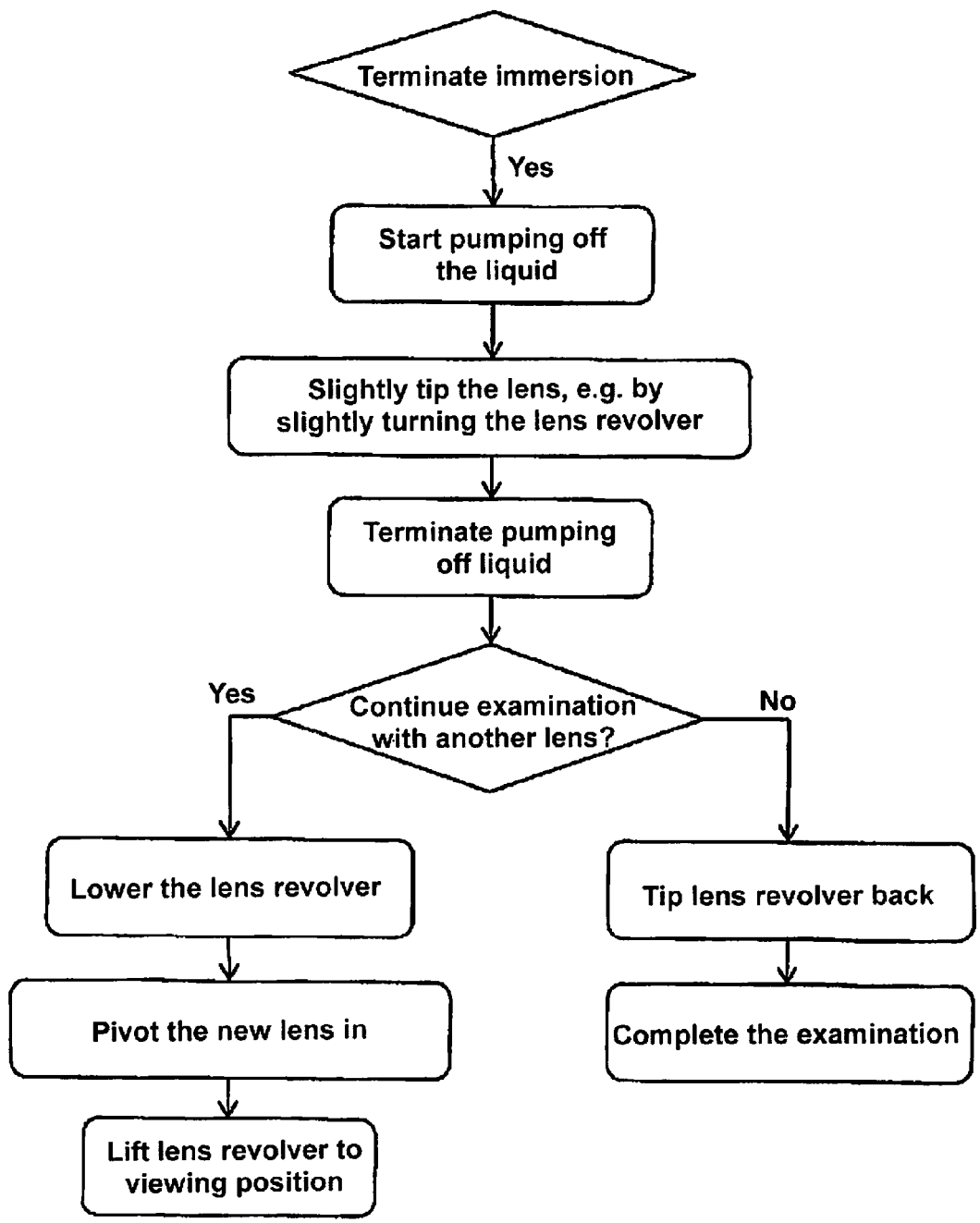
FIG. 3 is a flow diagram of a method of terminating immersion of an immersion lens in a microscope according to an embodiment of the invention.

The method according to the invention for terminating immersion will be explained in more detail in FIG. 3 by means of a flow diagram, wherein the individual method steps do not necessarily all have to be carried out strictly one after the other, they may also be combined with each other.

For example, the pumping off of the immersion media (liquid) 5 and the tipping of the immersion lens 3 may be started in parallel, or the pumping off of the immersion media 5 does not start until the immersion lens 3 has been tipped.

If the immersion lens 3 is to be replaced after the removal of the immersion media 5, the lens revolver can advance directly from the tipped position to the desired lens. Alternatively, it is also possible to pivot the immersion lens back first, then lower it down and only then pivot it to the new lens. This would be of advantage if it is to be avoided that the protective sheath rubs along the front lens during the lowering operation.

It is also conceivable to initiate the removal of the immersion media by way of a lateral movement of the sample table. Whilst the sample table is being traversed, the immersion media continues to remain between the lens front of the immersion lens and the sample vessel bottom, however it is continually displaced in the direction of the table movement. This is of advantage if the table movement is moved towards the pump-off opening.

What is claimed is:
1. A method for terminating the immersion at a microscope having at least one immersion lens, wherein an immersion film region associated with the at least one immersion lens is sealed by means of a protective sheath that is in communication with an immersion media supply unit and an immersion media discharge unit via at least one discharge channel, the method comprising:
starting the discharge of the immersion media with the lens positioned at an initial position;
tipping the lens in the direction of the discharge channel;
terminating the discharge of the immersion media; and
moving the lens back into the initial position.
2. The method of claim 1, wherein tipping the immersion lens and moving the immersion lens back into the initial position are carried out by way of rotational movements of a lens revolver.
3. The method of claim 1, further comprising replacing the immersion lens.

4. The method of claim 3, wherein the microscope includes a lens revolver, and wherein the method includes lowering the lens revolver to replace the lens with a different lens.

5. The method of claim 1, wherein discharge of the immersion media is initiated with a lateral movement of a bottom side of a sample carrier.

6. The method of claim 1, wherein discharge of the immersion media is initiated with a suction pump.

7. A device for terminating the immersion at a microscope having at least one immersion lens, comprising:
- a protective sheath around an immersion film region associated with the at least one immersion lens, the immersion film region containing immersion fluid;
- an immersion media supply unit fluidly coupled with the protective sheath; and
- an immersion media discharge unit fluidly coupled with the protective sheath wherein the immersion lens is arranged within the sealing protective sheath towards an optical axis thereof in such a way that the immersion lens can be tipped by a rotational movement of a lens revolver toward the immersion media discharge unit.

8. The device of claim 7, wherein the protective sheath is a membrane located below a sample vessel, the membrane having a central opening, a front of the immersion lens protruding through the central opening.

9. The device of claim 7, wherein the protective sheath has at least one discharge channel.

10. The device of claim 7, further comprising a suction pump for actively discharging the immersion media from the immersion film region.

11. The device of claim 7, wherein the lens revolver is axially displaceable.

12. The device of claim 7, further comprising a sample table and a sample carrier, and wherein the sample table and the sample carrier are axially movable.

13. The device of claim 7, further comprising a sample table and a sample carrier, and wherein the sample table and the sample carrier are laterally movable.

14. The device of claim 7, wherein the protective sheath is a membrane, and wherein the form of the immersion lens, the form of the membrane, and a surface of the membrane are adapted such that the membrane pressed against a contact surface of the immersion lens seals the immersion region against the immersion lens.

* * * * *